March 1, 1960  I. JEPSON  2,926,478
MULTIPLE BLADE ROTARY POWER MOWER
Filed March 28, 1956  5 Sheets-Sheet 3
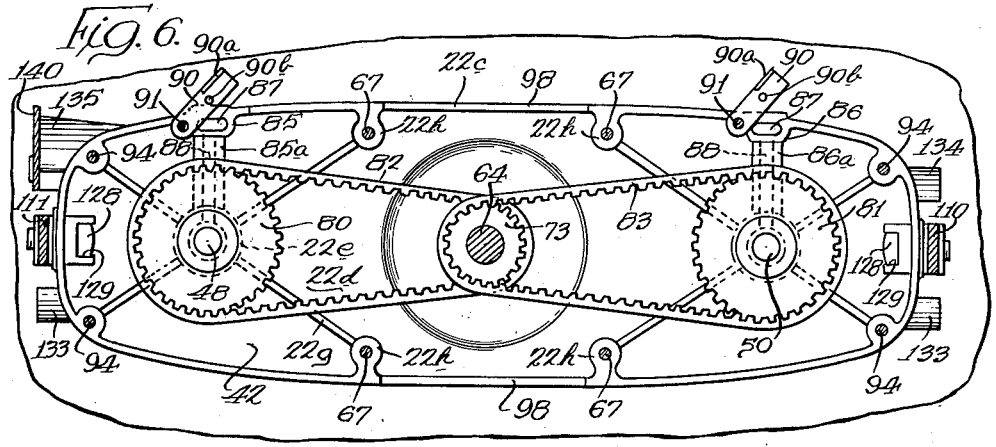
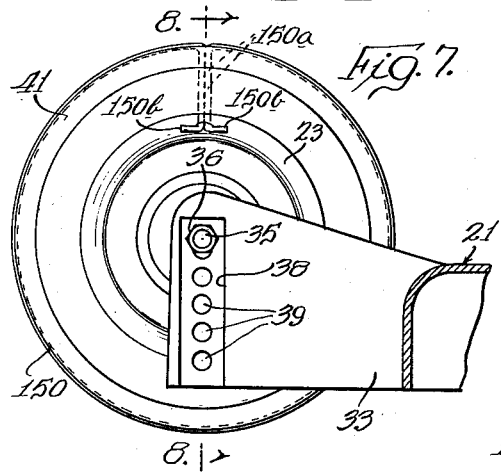
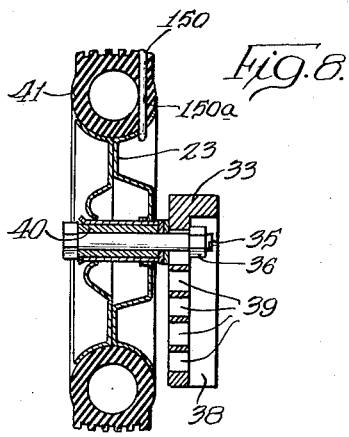
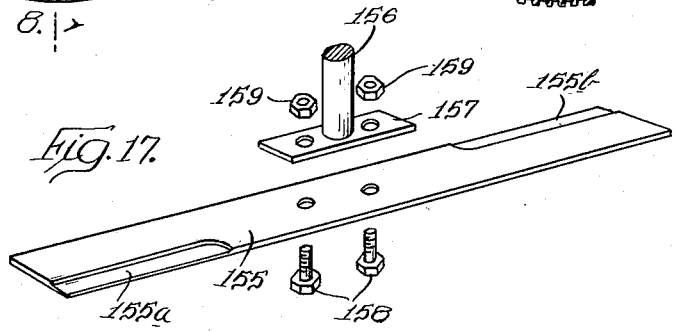
INVENTOR.
Ivar Jepson
BY
Mason, Kolehmainen, Rathburn and Wyss
Attys.

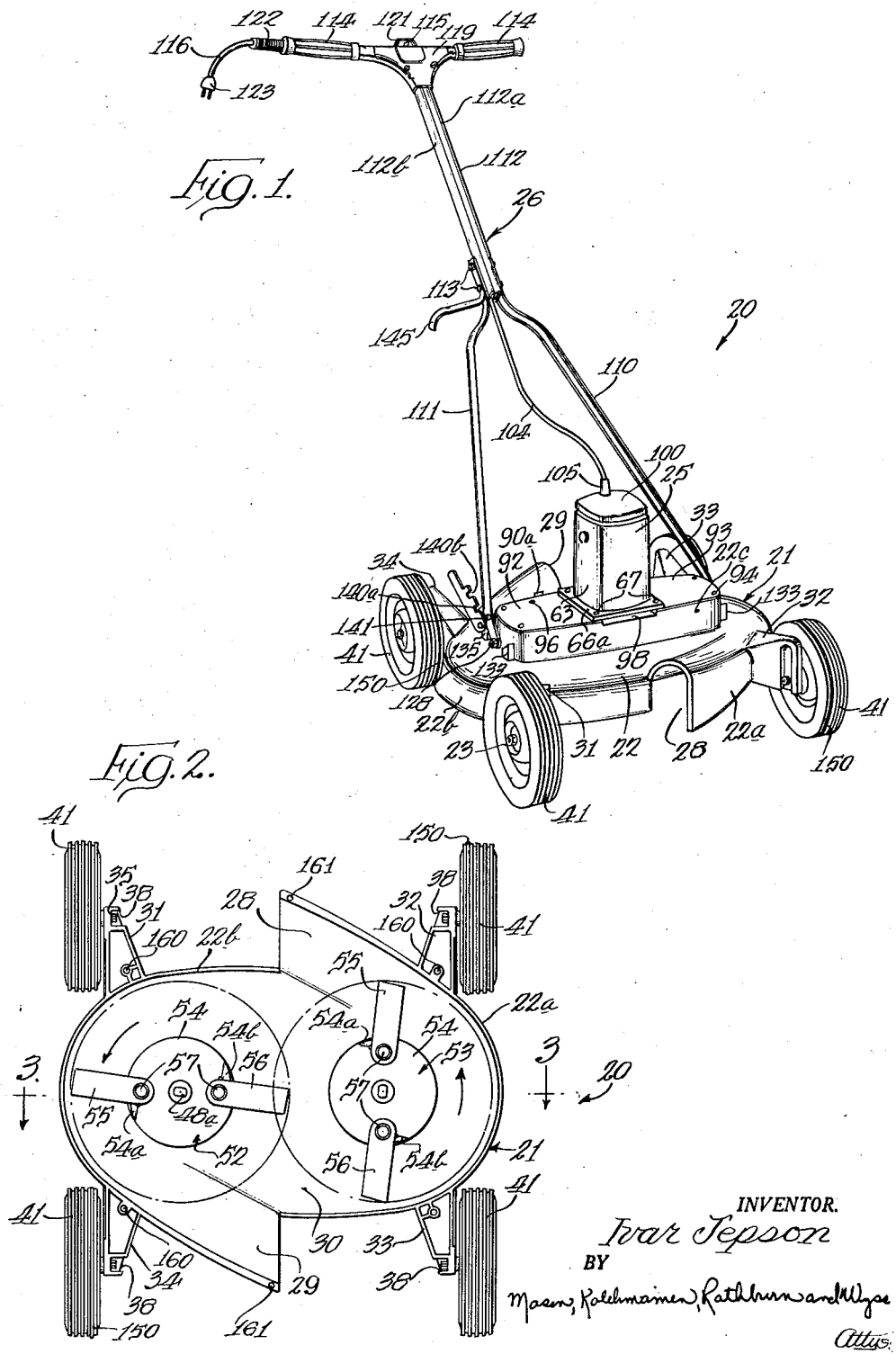

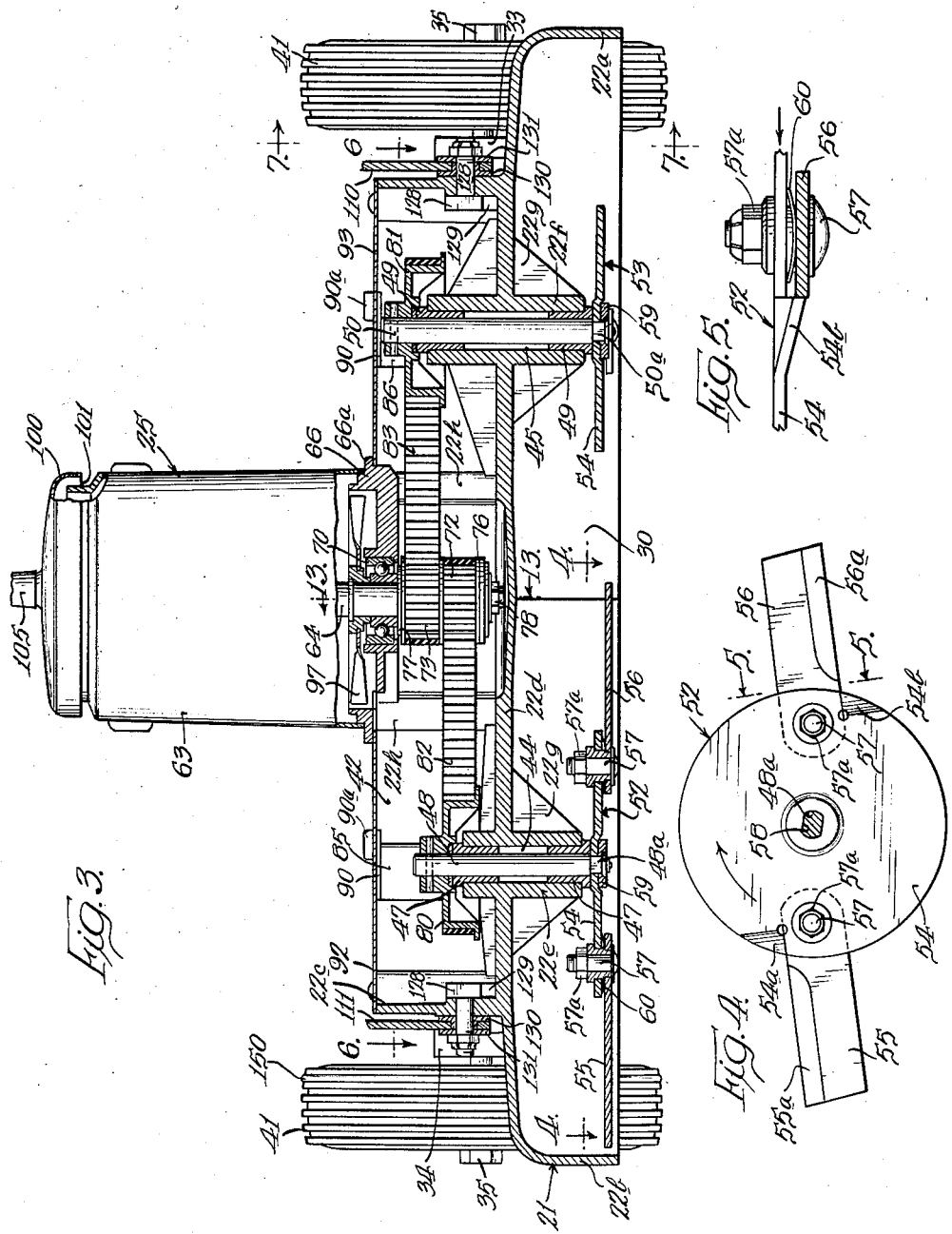

March 1, 1960      I. JEPSON      2,926,478
MULTIPLE BLADE ROTARY POWER MOWER
Filed March 28, 1956      5 Sheets-Sheet 4
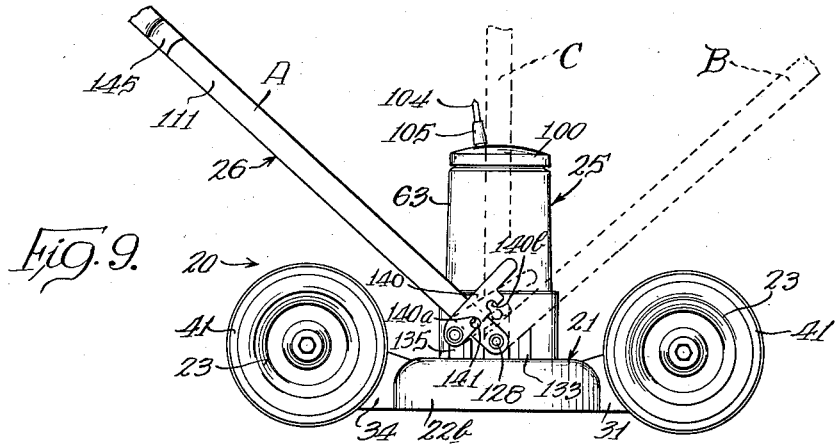
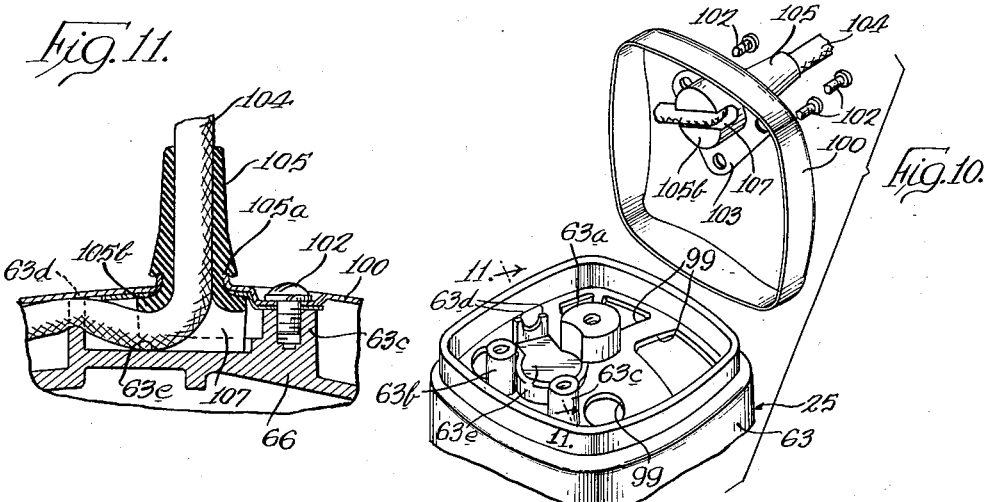
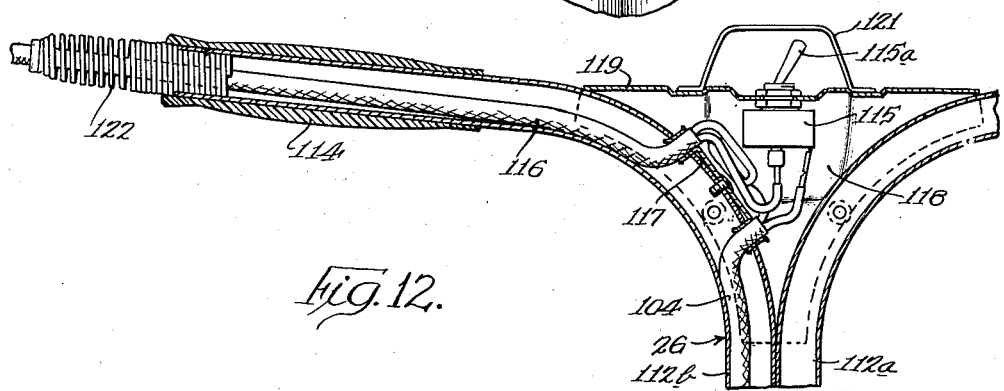
INVENTOR.
Ivar Jepson
BY
Mason, Kolehmainen, Rathburn and Wyss
Attys.

March 1, 1960

I. JEPSON 2,926,478

MULTIPLE BLADE ROTARY POWER MOWER

Filed March 28, 1956

INVENTOR.
Ivar Jepson
BY
Mason, Kolehmainen, Rathburn and Wyss.
Attys.

United States Patent Office 2,926,478
Patented Mar. 1, 1960

2,926,478

MULTIPLE BLADE ROTARY POWER MOWER

Ivar Jepson, Oak Park, Ill., assignor to Sunbeam Corporation, Chicago, Ill., a corporation of Illinois Application March 28, 1956, Serial No. 574,489

17 Claims. (Cl. 56—25.4)

The present invention relates to lawn mowers, and, more specifically, to power lawn mowers of the type in which a suitable prime mover is associated with the lawn mower to drive the cutting mechanism.

In recent years there has been a tremendous increase in the demand for power lawn mowers. This has been brought about for several reasons. First of all, with the high cost of labor, the householder finds it difficult to get help to mow lawn, and, secondly, the power operated lawn mower has been made available at prices which make it attractive to the ordinary householder. As a matter of fact, at the present time more than a million power operated lawn mowers are sold every year.

Power lawn mowers are of several different types. First of all, with regard to the cutting mechanism, there are available what are known as reel type lawn mowers and also what are known as rotary type lawn mowers, the latter being a mower in which a blade, generally parallel with the surface to be mowed, is driven at high speed by a suitable prime mover. In addition, power operated lawn mowers have been sold which employ internal combustion engines for the prime mover, and others have been sold utilizing an electric motor as the prime mover. Where the prime mover is an internal combustion engine, the device is self-contained and no connection with an external power source is required. However, particularly with a rotary type cutting mechanism, a power lawn mower driven by an internal combustion engine is likely to be noisy, and in highly populated areas it may not be desirable to use the same early in the morning, for example, when certain people wish to sleep. For that reason, there has been a demand for an electric powered lawn mower in view of the inherent quietness thereof, thus making it usable for cutting lawns without the possibility of disturbing close neighbors.

The conventional rotary type power mower employs a housing which encloses the rotary blade rotating at high speed. If it is necessary to examine the blade, it is generally necessary to tip the housing on its side, and where the prime mover is an internal combustion engine, there is always the problem of spilling oil or gasoline. This problem is twofold: first, with respect to losing oil or gasoline, and, second, the damage such oil or gasoline would do to the lawn upon which it is spilled. Where the prime mover is an electric motor, no problem of spilling gasoline is involved, and thus, when driving a rotary type blade, the mower may readily be tilted on its side without creating any problems. Moreover, no cranking or choking of an engine is required where an electric motor is employed.

Electric powered lawn mowers, both of the reel type and more recently of the rotary type, have been available for many years. However, such electric powered mowers have never enjoyed the wide acceptance that lawn mowers powered by an internal combustion engine have enjoyed. First of all, these prior electric powered lawn mowers have fallen far short of the needed power. Some of the early models were powered with a one quarter horse power motor, and just recently lawn mowers equipped with a one half horse power electric motor have been available. Tests have demonstrated that satisfactory operation for a rotary lawn mower cutting an eighteen inch swath requires a one horse power electric motor which is from two to four times the power heretofore provided in electric lawn mowers. Moreover, in prior electric lawn mowers, the cutting blades of the rotary mower travelled much too slowly for satisfactory operation. These mowers were operated at somewhere between 1,700 and 3,500 r.p.m., which were no-load speeds and which, of course, were reduced considerably when the mower was actually used to cut grass. It would be desirable to provide a rotary lawn mower in which the cutting blades travel at a speed in excess of 4,000 r.p.m., and preferably of the order of 6,000 or more revolutions per minute, and wherein an electric motor of sufficient power of the order of one horse power or more to drive the same is employed.

Rotary power lawn mowers have been criticised because of what is commonly termed "scalping of the lawn." Where it is desired to cut a substantial swath of the order of twenty inches or more, a problem arises when cutting an uneven lawn in that a relatively large platform is required, supported by suitable wheels or the like, and if one corner of the platform is at a substantially different level than one or more of the other corners, it is quite likely that scalping of the lawn will occur due to the rotary blade engaging a portion of the ground when one wheel of the mower is in a hole or the like. The scalping problem can be eliminated or reduced by reducing the spacing between the supporting wheels. However, to afford any reasonable size cut, the spacing between the wheels is limited by the size of the blade employed. It would be desirable to provide a power operated lawn mower of the rotary type having a much smaller casing dimension from the front to rear direction, thereby permitting close spacing of the wheels and eliminating scalping without, however, reducing the width of the cut.

Power operated mowers employing an electric motor as the prime mover thereof, unless a battery or other self-contained source of electric energy is connected to the motor, require connection with an external source of electrical energy, and consequently require a power cord of substantial length to permit mowing a lawn of any size. It would be desirable to provide an electric motor driven power lawn mower in which the problem of handling a mowing operation without cutting the cord is completely eliminated. A power operated lawn mower should also be relatively light in weight so that it can be handled without difficulty by women. Consequently, it would be desirable to provide a simple construction having relatively few parts of lightweight material, thus providing a lightweight device and furthermore insuring a device which will give long years of trouble-free service.

Rotary lawn mowers normally employ a discharge chute through which clippings escape from the cutting chamber for distribution over the lawn. It would be desirable to provide an arrangement wherein two discharge chutes are employed instead of one, as heretofore, thus resulting in a more even distribution of clippings over the lawn and providing a cleaner, better groomed appearing lawn.

Although it is generally not desirable to mow lawns when the grass is wet, sometimes this becomes necessary due to weather conditions which are not conducive to satisfactory lawn mowing. It is common practice for power operated lawn mowers to be supported on suitable wheels provided with rubber tires, thereby doing a minimum amount of damage to the lawn surface. However, such rubber tires insulate the mower structure from ground, and if there should be some damage to the electrical circuit, the source voltage or at least some leakage current might be applied to the lawn mower. It would be desirable in a power operated lawn mower having rubber-tired wheels to assure grounding of the mower structure at all times whenever the mower is supported from the wheels, thus eliminating any shock.

All power operated lawn mowers are dangerous instruments if one is careless, since the cutting means are operated at relatively high speeds. A rotary type power operated mower is probably even more dangerous than a reel type mower due to the high speed at which the blade rotates. Moreover, in rotary type mowers, as was mentioned above, it is necessary to have a discharge chute of some type to get rid of the grass cuttings, and there is always a problem of preventing one from inserting a foot or limb into the discharge chute with the possible engagement with the high speed cutting blade. Various guard devices have been employed to prevent one from inserting a limb or anything else into the discharge openings, but such guards tend to impede the discharge of grass. It would be desirable to provide an arrangement whereby the discharge chute is unimpeded as far as permitting grass cuttings to be discharged therethrough and yet wherein the possibility of inserting a limb or foreign object into the chute, and hence into engagement with the cutting blade, is reduced to a minimum.

It will also be understood that in any rotary type power lawn mower there is always the danger of the high speed blade striking a rock or object which could cause breakage of some part of the mower. It would be desirable to provide an arrangement wherein, when the cutting blade strikes some foreign object which might cause breakage, means are provided which would eliminate any breakage.

Accordingly, it is an object of the present invention to provide a new and improved power operated lawn mower having the various desirable features set forth above.

It is another object of the present invention to provide a rotary type power lawn mower of substantial width having a very short dimension from front to back substantially to eliminate the so-called "scalping" of the lawn.

It is another object of the present invention to provide a power operated lawn mower of simple and compact structure embodying a single one-piece casting providing both a cutting chamber and a separate housing for the drive mechanism.

It is a further object of the present invention to provide an improved power operated lawn mower having a pair of rotating blades displaced in phase from each other by ninety degrees and disposed in spaced relationship so that the two blades will cut a predetermined area with no gap between.

It is a further object of the present invention to provide a power operated lawn mower supported on rubber-tired wheels in which improved means for grounding the mower are provided.

Still another object of the present invention resides in a lawn mower driven by an electric motor having improved strain relief means between the power cord and the motor.

Still another object of the present invention resides in a power oeprated lawn mower having a pair of rotary blades disposed within a casing and a pair of discharge chutes associated with the casing, with the discharge chutes directed in a direction to minimize the possibility of inserting a limb or a foreign object into the discharge chutes.

A still further object of the present invention resides in the provision of a power operated lawn mower of the rotary type in which hinged cutting blades are provided to prevent breakage thereof by virtue of striking a foreign object such as a rock or the like.

Further objects and advantages of the present invention will become apparent as the following description proceeds, and the features of novelty which characterize the invention will be pointed out with particularity in the claims annexed to and forming a part of this specification.

For a better understanding of the present invention, reference may be had to the accompanying drawings in which:

Fig. 1 is a perspective view of a power operated lawn mower built in accordance with the present invention;

Fig. 2 is a bottom view of the lawn mower of Fig. 1;

Fig. 3 is an enlarged sectional view taken on line 3—3 of Fig. 2;

Fig. 4 is a sectional view taken on line 4—4 of Fig. 3, assuming that Fig. 3 shows the complete structure;

Fig. 5 is an enlarged fragmentary sectional view taken on line 5—5 of Fig. 4;

Fig. 6 is a sectional view taken on line 6—6 of Fig. 3, assuming that Fig. 3 shows the complete structure;

Fig. 7 is a sectional view taken on line 7—7 of Fig. 3, again assuming that Fig. 3 shows the complete structure;

Fig. 8 is a sectional view taken on line 8—8 of Fig. 7;

Fig. 9 is a side elevational view of Fig. 1 showing three different handle positions of the lawn mower of the present invention;

Fig. 10 is an enlarged fragmentary exploded perspective view of a portion of the electric motor associated with the lawn mower of Figs. 1 and 3;

Fig. 11 is a sectional view taken along line 11—11 of Fig. 10, assuming that Fig. 10 is an assembled relationship;

Fig. 12 is an enlarged plan view with certain cut away portions of one end of the lawn mower handle of the lawn mower of the present invention;

Fig. 17 is an exploded perspective view of a modified blade structure and cutter shaft for the lawn mower of the present invention.

Figure 13:
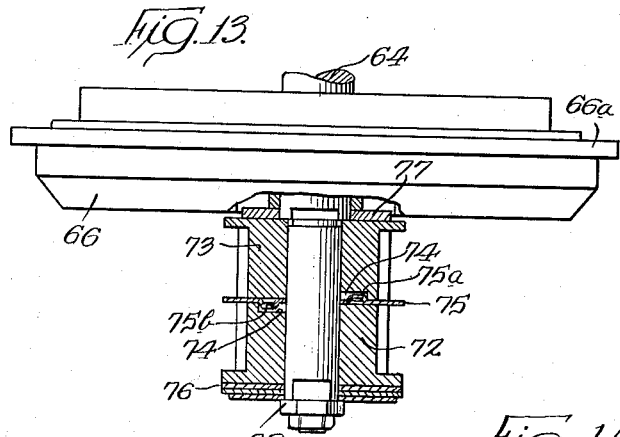
Fig. 13 is an enlarged fragmentary view of a portion of Fig. 3 including a sectional part taken on line 13—13 of Fig. 3.

Briefly, the present invention is concerned with a light-weight, electric powered rotary type lawn mower having high speed twin blades and twin discharge chutes. A reversible handle is provided so that mowing in either direction can be accomplished while permitting the power cord to come out of the same side of the mower. Means are provided to drive the twin blades in a manner so that they are displaced in phase from each other by ninety degrees, whereby there is no possibility of engagement of the ends of the blades which slightly overlap. The lawn mower is provided with means to ground the platform even though supported on rubber-tired wheels, and ready adjustment for different heights is provided. The dimensions of the blade housing from front to rear are very short so as to eliminate the possibility of scalping the lawn while still providing a wide cut. Simple means are provided for storing the power cord and eliminating the strain on the cord where connected to the mower. Each of the twin cutting blades may be hinged, if desired, to prevent breakage when striking a foreign object. Also, additional means are provided, if desired, in the form of a slip clutch to prevent damage to the mechanism.

Referring now to the drawings, there is illustrated a lawn mower, generally indicated at 20, which comprises a carriage 21, including a housing or support 22 suitably supported on ground wheels 23. Mounted on the carriage 21 is a prime mover, generally designated as 25, specifically indicated as an electric motor. For the purpose of guiding the carriage, there is included a handle assembly, generally designated at 26, which handle assembly is pivotally associated with the carriage 21 in a manner described in detail hereinafter.

Considering first the carriage 21, and specifically the housing or support 22 which substantially defines the carriage 21, it preferably comprises a one-piece casting formed of aluminum or other lightweight metal so as to maintain the weight of the lawn mower 20 at a minimum. This one-piece casting has downwardly directed skirt portions or peripheral flanges 22a and 22b, each of which is somewhat U-shaped, as shown in Fig. 2 of the drawings, with the open ends of the U's adjacent but displaced slightly, thereby providing discontinuities in the skirt portions to define discharge chutes 28 and 29 on opposed sides of the housing which might be designated the front or back sides of the housing. Since, as will become apparent from the following description, the lawn mower will alternately be moved first in one direction and then in the other, it is difficult to refer to either the front or the back of the lawn mower. In any event, the discharge chutes 28 and 29 are sort of tangential to the circular portion defining the bight portions of the peripheral flanges 22a and 22b. The space defined by the housing 22 within the confines of the skirt portions 22a and 22b might be designated as the cutter chamber 30 to which the discharge chutes 28 and 29 are connected.

For the purpose of supporting the carriage 21 for movement over the area to be mowed, the housing 22 is provided with integral arms projecting from what might be called the four corners thereof. As a matter of fact, the arms designated as 31, 32, 33 and 34 effectively define four corners of the housing 22. As illustrated, the arms 31 and 32 are disposed on the side of the exhaust chute 28, while the arms 33 and 34 are disposed on the side of the exhaust chute 29. The wheels 23 are secured one to each of the respective arms 31, 32, 33 and 34 by suitable wheel axle bolts 35 and associated nuts 36, best shown in Figs. 7 and 8 of the drawings. As there illustrated, each arm such as 33, for example, is provided with a recess 38 within which are provided a plurality of vertically spaced openings 39 for receiving the associated wheel axle bolt 35. Thus, with this arrangement the height of the cut can be adjusted in dependence upon the particular openings 39 in which the bolts 35 are inserted. Obviously, when the bolt is in the highest opening, as indicated in Figs. 7 and 8, the mower is set to cut the closest cut. It will also be understood that all of the wheels 23 will be supported with the bolts 35 disposed in corresponding openings 39 so as to insure the same height of cut over the entire cutting area. In a device built in accordance with the present invention, the openings 39 were spaced so that a change of one opening would permit a 7/16 inch height adjustment. In this embodiment the height adjustment was from 7/8 of an inch to 2 5/8 inches, the higher the hole being employed, the closer the cut.

As best shown in Fig. 8 of the drawings, each wheel 23 is provided with a centrally disposed wheel axle sleeve 40 serving as a suitable bearing to receive the associated wheel axle bolt 35. Preferably and as illustrated, the wheels 23 are provided with rubber tires indicated at 41, thus providing an arrangement which is relatively noiseless when moving on a hard surface such as a sidewalk and which will do a minimum of damage to a lawn, and which furthermore also provides a pleasing appearance.

In accordance with the present invention, the housing 22, comprising a lightweight casting, also includes an integral upwardly directed peripheral flange 22c for defining a mechanism chamber, generally designated by the reference numeral 42. The cutting chamber 30 and mechanism chamber 42 are separated by a common wall 22d integral with housing 22. Since a very simple driving mechanism is employed, a small mechanism chamber 42 is sufficient and, as illustrated, does not extend over the entire housing 22.

From the above description and particularly from Figs. 2 and 3 of the drawings, it will be apparent that the arms 31, 32, 32 and 34 are disposed inside the extremities of the spaced bight portions of the U-shaped peripheral flanges 22a and 22b, so that with the wheels 23 mounted thereon, the housing projects even slightly beyond and between the wheels 23. Thus, a rotating cutting blade within the cutting chamber 30 defined by the housing 22 will, as best shown in Figs. 2 and 3, cut at least to the outside edges of the wheels 23 and thereby assure satisfactory mowing along edges, against walls, and the like.

For the purpose of accommodating suitable cutting means within the cutting chamber 30, the wall portion 22d is provided with a pair of spaced parallel integral sleeve portions 22e and 22f which provide vertically extending passageways 44 and 45 extending between the cutter and mechanism chambers 30 and 42. As is best shown in Fig. 3 of the drawings, the sleeve portions 22e and 22f extend both above and below the wall portion 22d, and suitable integral bracing means 22g are provided around each sleeve portion to insure a rigid structure. The portions of the sleeves 22e and 22f extending into cutting chamber 30 are identical, but the portions extending into mechanism chamber 42 are of different lengths. As best shown in Fig. 3, the sleeve portion 22e extends only a short distance into mechanism chamber 42, while the sleeve portion 22f extends a greater distance into mechanism chamber 42. Also, as best shown in Fig. 3, suitable bearings 47 are disposed within the passageway 44 defined by sleeve 22e, and a vertically disposed cutter shaft 48 is journalled in these bearings. Similarly, suitable bearings 49 are disposed within the passageway 45 defined by sleeve portion 22f, and journalled therein is cutter shaft 50, which is somewhat longer than cutter shaft 48, the reason for which will become apparent as the following description proceeds.

In accordance with the present invention, the cutter shafts 48 and 50 are each adapted to support one of a pair of identical twin blades or rotatable cutting members generally designated by the reference numerals 52 and 53 which might be termed first and second rotary cutters. In order to insure that grass is cut over the entire width of the housing, as represented by the cross-sectional view of Fig. 3, the cutting member 52 effectively extends from just inside the peripheral flange 22b to slightly beyond the center of the housing 22, and similarly the cutting member 53 extends from just inside the peripheral flange 22a to slightly beyond the center of the housing 22. This is best shown in Fig. 2 of the drawings, where the paths of the tips of the cutting members 52 and 53 are illustrated, and it is clear that these paths overlap at the center of the housing 22. Obviously then, the cutting members 52 and 53 must be displaced in phase to prevent interference thereof upon high speed rotation thereof, and, moreover, this phase displacement must be maintained at all times. The arrangement for accomplishing this will be described in detail hereinafter.

It will be appreciated that, in operation, the twin rotary cutting members 52 and 53 may strike a stone or other foreign object directly in the path of the mower 20. In order to prevent any damage when an obstruction is struck by either of the cutting members, each rotary cutting member 52 and 53 comprises a central support member 54 to which are secured a pair of pivoted blade members 55 and 56, the blade members being pivotally mounted about bolts 57 disposed at diametrically opposed points on the support member 54. As illustrated, the support member 54 is a circular disk, preferably having a non-circular opening 58 therein to receive a correspondingly-shaped portion of the associated cutter shaft. As illustrated in Fig. 4 of the drawings, where the cutter shaft 48 is involved, this portion is designated by the reference numeral 48a. Thus, the support portion 54 is nonrotatably mounted on the associated cutter shaft such as 48 or 50. Moreover, to insure that the support member 54 is suitably secured to the associated cutter shaft for high speed rotation therewith, the portion 48a of the cutter shaft 48 and a similar portion 50a of the cutter shaft 50 extend through the associated support member 50 and an associated reinforcement washer 59 and the assembly is welded whereby the supports 54 are integrally secured to the associated shafts 48 and 50.

Considering the cutting members 52 and 53 in more detail, with reference to Figs. 3, 4 and 5 of the drawings, each blade member 55 and 56 is secured to the under side of its associated support 54 as by the bolt 57 preferably provided with a suitable nut 57a which will not come loose during use. To provide a predetermined frictional force between the associated support 54 and each blade member such as 55 or 56, there is preferably interposed a spring washer 60. It will be appreciated that upon high speed rotation of the supports 54, centrifugal force will cause the blade members 55 and 56, hinged or pivoted thereto, to move to the extended position indicated in the drawings. If, however, an obstruction engages one of the blades, it is free to pivot about its bolt 57 and thus will minimize any damage due to the cutting blades striking an obstruction. Preferably, rotation of the blades 55 or 56 about their pivot points 57 in a direction opposite to that which would be encountered by striking an obstruction is limited by suitable stop means, and to this end the supports 54 are deformed as indicated at 54a and 54b at diametrically opposed points to provide a stop engaging the leading edge of the blade portions such as 55 or 56. This is evident by noting the position of the stops 54a and 54b in Fig. 2 of the drawings with respect to the arrows indicating the direction of movement. Thus, the stops 54a and 54b limit rotation of the blade portions 55 and 56, respectively, relative to the supports 54 in a direction which would be opposite to that occasioned by having the cutting edge of the blades strike an obstruction. The friction provided by the spring washers 60 is sufficient ordinarily to maintain the blades in the extended positions shown in the drawings and, hence, eliminates noise on starting the mower. Furthermore, the friction washers will maintain the blade portions fixed against the stops with the result that wear is eliminated. However, they will not interfere with movement of the blades when they strike an obstruction. Also, centrifugal force will cause the blades to assume the extended positions as soon as the obstruction no longer interferes, whenever the supports 54 are rotated at a sufficiently high speed. It will be appreciated that the blades must be designed and rotated at a speed such that the centrifugal force holding them in an extended position exceeds the reaction force exerted by the grass being cut.

For the purpose of rotating the cutter members 52 and 53 at high speed, the prime mover in the form of the electric motor 25 is provided. This motor is indicated as being provided with a cylindrical housing 63 preferably formed as a lightweight metal casting enclosing an electric motor of conventional type having a shaft 64. In order to provide a simple drive connection between the cutter shafts 48 and 50 and the motor 25, the motor shaft 64 is preferably disposed in a vertical direction, which is accomplished by supporting the housing 63 on the upwardly directed flanges 22c defining the mechanism chamber 42. As illustrated in Fig. 3 of the drawings, a lower motor bearing plate and end closure member 66 is provided with a peripheral flange 66a of somewhat rectangular shape. Suitable fastening means 67 are employed to secure plate 66 and the motor fastened thereto to the upstanding flanges 22c. As illustrated, the casting defining the housing 22 is provided with integral enlargements designated at 22h (Fig. 6) including tapped openings therein to receive the fastening means 67. Thus, the bearing plate 66 for the motor housing 63 also provides a partial enclosure for the mechanism chamber 42. As illustrated in Fig. 3 of the drawings, the motor shaft 64 has the lower end thereof journalled in a suitable bearing 70 supported in the bearing plate 66.

Figure 14:
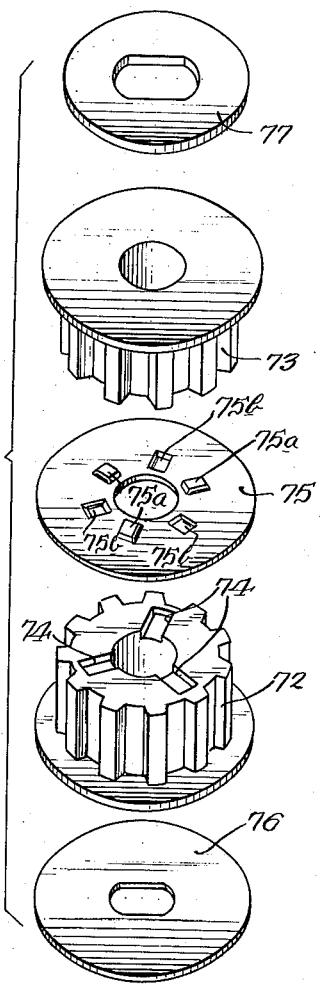
Fig. 14 is an exploded perspective view of a portion of Fig. 13.

For the purpose of converting rotary motion of the motor shaft 64 to rotary motion of the cutter shafts 48 and 50, there are secured to the portion of the motor shaft 64 extending into mechanism chamber 42, as best shown in Figs. 3, 13 and 14 of the drawings, a pair of belt driving pulley gears 72 and 73 which might be termed first and second pulleys, the pulley gear 73 being disposed immediately above the pulley gear 72. Specifically, and as best shown in Fig. 14 of the drawings, the pulley gears 72 and 73 are identical but are arranged on the shaft 64 in reverse relationship. One end of each gear is flanged and the other end is provided with a plurality of spaced recesses indicated at 74, with the recessed ends of the gears disposed in face to face relationship. Preferably, these two pulley gears are effectively provided with interlocking lugs to prevent relative rotation between them. This is accomplished in a simple manner by an interlocking washer 75 interposed between pulley gears 72 and 73 which washer has protuberances 75a on one face and protuberances 75b on the other face. As illustrated, the protuberances 75a are received in the recesses 74 of pulley gear 73 and protuberances 75b are received in recesses 74 of pulley gear 72. The protuberances 75a are angularly displaced from the protuberances 75b so identical pulley gears can be used. These pulley gears 72 and 73, although effectively locked together, are preferably not keyed to the motor shaft 64. To cause these pulley gears 72 and 73 to rotate with motor shaft 64 they are effectively clamped thereto between a pair of friction washers 76 and 77 engaging the flanged ends respectively of pulley gears 72 and 73. These friction washers preferably have non-circular openings therein so as to cooperate with similarly shaped portions on shaft 64 whereby these washers are effectively fixed to the shaft as far as relative rotation thereof is concerned. By means of a nut 78 secured to the lower end of shaft 64, the compressive force applied by washers 76, 77 to pulley gears 72 and 73 may be controlled. Thus, there is effectively provided a slip clutch between the pulley gears 72 and 73 as a unit and the motor shaft 64. This provides a safety feature in the event that some force stops rotation of the cutting blades 52 and 53 and in a way supplements the pivoted blade construction described above. It may be possible to eliminate this slip clutch when the pivoted blade structure is used, but if a non-pivoted blade structure as disclosed in Fig. 17 of the drawings is employed, then the slip clutch described above is desirable.

From the above discussion the reason for the cutter shaft 50 being longer than the cutter shaft 48 becomes apparent. Suitably secured to the upper end of the cutter shaft 48 is a toothed pulley or pulley gear 80, while secured to the upper end of the cutter shaft 50 is a toothed pulley 81. These pulleys or pulley gears 80 and 81 are disposed within the mechanism chamber 42 and are disposed, respectively, on the levels of the pulley gears 72 and 73 drivingly secured to the motor shaft 64 through the slip clutch arrangement described above. A suitable so-called timing belt 82 drivingly interconnects the pulley gear 80 and the pulley gear 72, while a similar timing belt 83 interconnects the pulley gears 81 and 73. These timing belts, which might be termed first and second belts, are effectively endless belts of suitable material such as rubber or other synthetic material and are provided on the pulley engaging faces thereof with teeth or projections. They are called timing belts, since they insure a constant phase relation between the driving and driven member, and in this regard function as the well-known chain and sprocket arrangement. Obviously, a chain and sprocket arrangement or a gear arrangement could be employed for drivingly interconnecting the motor 25 and the cutter shafts 48 and 50. The disclosed arrangement is believed to be very simple and compact, and provides a relatively noiseless construction which will give long years of trouble-free service.

In the illustrated arrangement, the belt and pulley arrangements cause the cutter shafts 48 and 50 to rotate at a somewhat lower speed than the speed of rotation of motor shaft 64. However, it will be obvious that any suitable speed may be obtained by the proper ratio of the pulley gears associated with the motor shaft and the cutter shafts. In a lawn mower built in accordance with the present invention, the cutter blades at no-load were rotated in excess of 4,000 r.p.m. and, in fact, as high as 8,000 r.p.m. The motor under this same condition was rotated at 16,000 r.p.m. A full horse power electric motor was employed. Thus, a lawn mower is provided having from two to four times the power of prior electric powered lawn mowers. Moreover, the cutter speed is at least twice the speed of prior art rotary type mowers.

In view of the high speed of the cutter blades, it is important that satisfactory lubrication be assured at the bearings 47 and 49. To this end the motor housing 22 is provided with hollow enlargements 85 and 86 having vertically extending passageways 87 defined therein. The housing 22 includes horizontal enlargements 85a and 86a interconnecting the vertical enlargements 85 and 86, with the corresponding sleeve portions 22e and 22f, respectively. A suitable passageway 88, extending in a horizontal direction, is preferably drilled in each of the enlargements 85a and 86a so as to connect the passageways 87 with the passageways 44 and 45 defined in the sleeve portions 22e and 22f. Thus, ample lubrication can readily be supplied to the cutter shaft bearings.

To close the upper end of oil passageways 87, there is provided for each passageway a cover 90 which is pivotally supported as indicated at 91 to the upper end of the peripheral flange 22c adjacent the particular passageway 87 with which it is associated. Preferably, the covers 90 are provided with upwardly directed flange portions 90a to permit ready finger engagement thereof to expose the upper end of the passageways 87.

For the purpose of enclosing the mechanism chamber 42 or the portions thereof not enclosed by the bearing plate 66 of the motor 25, a pair of cover plates 92 and 93 are provided, shaped to conform to the periphery of the ends of the flange 22c, best shown in Fig. 6 of the drawings. Suitable fastening means 94, engaging tapped openings in enlargements in the peripheral flange 22c of the housing 22, hold the cover plates 92 and 93 in position. These cover plates are provided with oil holes designated at 96 in Fig. 1 of the drawings, which are aligned with the upper ends of the passageways 87. Moreover, the peripheral flange 22c is recessed slightly to permit the oil hole cover plates 90 to pivot beneath the mechanism chamber cover plates 92 and 93. Preferably, the oil hole cover plates are provided with suitable dimples such as 90b to maintain them in the closed position once they are so moved and to prevent vibration from causing them to move to the open position. The tabs 90a, of course, limit pivotal movement thereof beyond the closed position.

It will be appreciated that it is desired to cool the motor 25 during operation thereof, and to this end a fan 97 is secured to the motor shaft 64 in any desired manner. Moreover, the top of the peripheral flange 22c immediately beneath the bearing plate 66 is cut away both front and rear as indicated at 98 (Figs. 1 and 6 of the drawings) whereby cooling air may be caused to flow through the passageway defined by the cutaway portion 98 and the bearing plate 66. The upper end of the motor housing 63, as best shown in Fig. 10 of the drawings, is provided with a plurality of openings, as indicated at 99, through which the motor cooling air may flow. To provide protection against the weather, however, there is secured to the upper end of motor housing 63 a suitable cover 100, which cover is supported on a plurality of projections 63a, 63b and 63c, preferably formed integral with the motor housing 63. Thus, there is provided an annular space designated as 101 in Fig. 3 of the drawings through which cooling air may flow. At the same time rain is precluded from entering the upper end of the motor housing 63. The cover 100 is secured to the projections 63a, 63b and 63c by a plurality of fastening means 102 which extend through openings in the cover. In order to prevent rain from entering these openings, a suitable gasket 103 is employed which extends over all of the projections 63a, 63b and 63c.

To operate electric motor 25, it is, of course, necessary to connect electrical power thereto. To this end there is provided a power cord 104 which preferably enters the motor housing through an opening in the top of the cover 100. To provide a waterproof entrance, there is preferably employed a suitable grommet 105 formed of a molded rubber or the like having a passageway extending therethrough for receiving the cord 104 and tightly gripping the same in a waterproof manner. Preferably, the grommet 105 is provided with an undercut portion 105a on the exterior thereof so that when inserted through the opening in the cover 100 it will effectively be clamped in place, as best shown in Fig. 11 of the drawings. The lower enlarged end 105b of the grommet 105 is provided with a transverse notch 107 to permit the cord 104 to make substantially a right angle bend and still be disposed within the notch 107. Suitable leads (not shown) connected to the end of the power cord 104, enter the motor housing through the openings such as 99 and electrically connect the motor to the power cord 104 in a conventional manner. To provide a strain relief arrangement with respect to the power cord 104, there is provided in accordance with the present invention an arrangement best shown in Figs. 10 and 11 of the drawings in which the upper end of the motor housing 63 beneath the cover 100 is provided with a pair of integral spaced fingers 63d adjacent a relatively flat surface portion 63e. When the cover 100 is secured in place by the fastening means 102, the cord 104 is disposed within the notch between the upstanding fingers 63d and is effectively clamped between the bight portion of this notch and the cover 100. The power cord abuts against the flat portion 63e, and a rather abrupt turn, as best shown in Fig. 11, is made in the cord which tends to wedge the cord in the grommet 105 and further prevent it from being pulled through the grommet, thus affording a satisfactory strain relief action.

In order to manipulate the power mower, a handle assembly 26 is employed which is best shown in Figs. 1, 9 and 12 of the drawings. As illustrated, the handle assembly 26 comprises a lower bifurcated portion comprising a pair of fork members 110 and 111 which have their upper ends secured to an upper handle assembly 112 comprising tubular members 112a and 112b. These tubular members 112a and 112b are welded or otherwise secured together, and then this assembly is preferably bolted as by fastening means 113 to the upper ends of the fork members 110 and 111. The upper handle assembly 112 is designed so that each section 112a and 112b has a lateral projection to receive a handle bar grip such as designated at 114, thus providing a hand grip portion by which the operator may manipulate the mower. Preferably, the power cord 104, as shown in Fig. 12 of the drawings, extends through one of the tubular members such as 112a or 112b.

It is, of course, desirable that the operator may readily control the energization of the motor 25, and to this end a suitable switch 115 is mounted within the space defined by the divergence of the lateral projections of the tubular handle portions 112a and 112b, as is best shown in Fig. 12 of the drawings. The power cord 104 preferably terminates in this space so as to permit ready connection to be made to the switch 115. Moreover, a power cord 116 enters this area through the other end of tubular member 112b and through an opening in the grip 114 associated with that member 112b. A suitable strain relief element 117 is provided so that no strain will be applied to the electrical connections made to the switch 115. Strain relief element 117 is effectively a double strain relief element for both the cord 116 and the cord 104 with respect to the connection to the electrical switch 115. The electrical connections to the switch and the switch 115 itself are housed within a chamber 118 defined by members 112a and 112b and U-shaped member 119. Each leg of the U-shaped member 119 is of somewhat T configuration, as clearly shown in Figs. 1 and 12 of the drawings, with the head of the T defining the bight portion of the U-shaped member 119. A manually actuatable switch lever 115a of the switch member 115 projects outside this chamber 118 so that the operator may readily manipulate the same even through the switch and electrical connections are disposed within this chamber defined by the upper handle assembly 112 and the U-shaped member 119.

To prevent damage to the switch lever 115a, and moreover to prevent inadvertent actuation thereof, preferably a switch lever guard 121 is welded or otherwise secured to the bight of the U-shaped member 119. Suitable indicia may be applied to the U-shaped member 119 to indicate the particular condition of the switch lever 115a. Furthermore, to eliminate wear of the power cord 116 where it enters the grip 114 and to support the cord at a greater distance from the center of the lawn mower, a coiled spring 122 may preferably be provided, arranged concentrically with the power cord and the end of the handle grip portion 114. As illustrated, the power cord 116 is relatively short and terminates in a conventional male type plug connector 123 for connection with a power cord. In this way, the power cord may be disconnected closely adjacent the mower and a minimum of extension cord is normally associated with the lawn mower 20.

With the above described arrangement, the power cord 116 comes out of the lawn mower on one side thereof, and to avoid any problem with the power cord, it would be desirable to be able to reverse the handle and push the mower first in one direction and then in the other, with one side of the mower being the front when moving in one direction, and the opposite side being the front when going in the other direction. To permit this, the handle 26 must be pivotally connected to the carriage 21 at an axis of symmetry. As illustrated, the fork portions 110 and 111 are pivoted one to either end of the flange 22c defining the mechanism chamber 42. As illustrated in the drawings, a handle pivot bolt 128 extends through the peripheral flange 22c at either end thereof. Moreover, the housing 22 is illustrated as having defined therein a rectangular recess 129 to receive the head of the bolt 128 in a nonrotatable manner. This bolt extends through the fork portions 110 and 111, as best shown in Figs. 3 and 6 of the drawings, and a suitable nut attached to the bolts 128 secures the handle to the housing 22 in a manner to permit pivotal movement about the common axis of bolts 128. Preferably, handle pivot washers 130 and 131 are disposed one on either side of the fork portions 110 and 111 where secured to the housing 22. Due to the symmetrical positioning, the handle 26 may readily be pivoted from one side to the other, as best shown in solid and in dotted lines by positions A and B in Fig. 9 of the drawings.

To limit the maximum rotation in a clockwise direction designated as position B in Fig. 9 of the drawings, the housing 22 is provided on either end thereof with a projection 133. To limit the maximum pivotal movement of handle 26 in the other direction as designated by position A in Fig. 9 of the drawings, the housing 22 is provided with integral projections 134 and 135, the projection 134 being identical with the projections 133, but the projection 135 being slightly different in order to accommodate another element which will be described hereinafter. Actually, these projections are provided with identical inclined faces to determine the maximum movement in either direction.

When moving over uneven ground, and particularly when mowing uphill, it is possible that the center of gravity of the carriage 21 and associated motor 25 might actually cause the carriage and motor portion to flip over on its back about the common axis of bolts 128 if too steep an incline were attempted. To preclude this, a latch member 140 is provided which is pivotally mounted to the projection 135. As a matter of fact, the reason for the difference between the projection 135 and the projections 133 and 134 is solely to accommodate the latch member 140. The latch member 140 is provided with a notch 140a to engage a pin 141 mounted in the adjacent fork 111 defining the handle 26. Thus, with the latch secured in the position indicated in solid lines in Fig. 9 of the drawings, the handle is maintained in a predetermined position relative to the housing against the projections or stop members 134 and 135. However, this latch will be used for this purpose only in rare situations where such undesirable operation might be encountered. Normally, the latch is held free of the handle 26 during a mowing operation so that it may be pivoted from one side to the other in moving back and forth across the area to be mowed.

Figure 15:
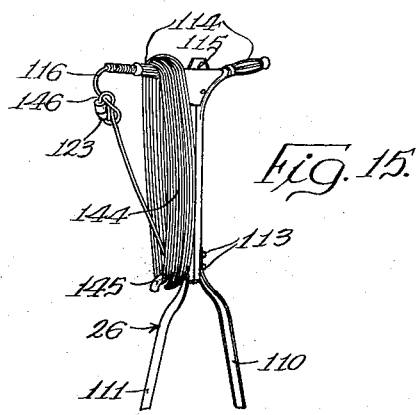
Fig. 15 is a somewhat perspective view showing the method of storing the power cord on the handle of the lawn mower of the present invention.

It will be understood that to mow a substantial area, quite a length of extension cord may be required, and a storage problem with respect to such cord is involved. It may be that the householder prefers to keep the cord on a separate reel. However, in Fig. 15 of the drawings there is illustrated a simple method of storing the extension cord designated as 144 on the handle 26. To accomplish this, the handle 26 is provided with a cord bracket 145, and the cord can then be wrapped around one of the handle grip portions and the cord bracket, as is clearly shown in Fig. 15 of the drawings. The cord bracket may be secured to the handle assembly 26 by the fastening means 113. Preferably, a simple knot as indicated at 146 is provided in the extension cord 144 at the point where it is connected to the plug connector 123 to prevent disconnection during use.

In order that the weight of the extension cord 144 wrapped around the cord bracket and one of the grip portions of the handle will not cause the mower to tip when stored in a suitable storage place, the latch member 140 is provided with another notch 140b to engage the pin 141 secured to the handle 26 thereby to hold the handle in an intermediate position designated in dotted lines in Fig. 9 of the drawings as position C. In this position the center of gravity of the handle and associated extension cord 144 is disposed in a manner so as to insure that the power mower 20 will not tip over due to the weight of the cord.

Figure 16:
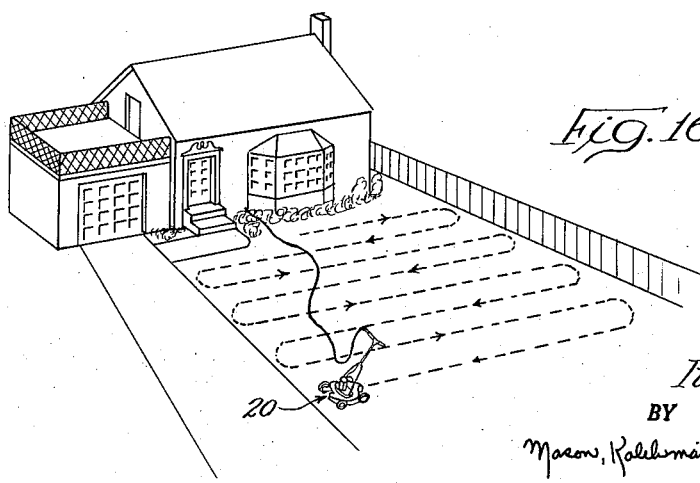
Fig. 16 is a perspective view showing somewhat schematically the approved mowing procedure for mowing a lawn with a lawn mower of the present invention.

From the above description it will be apparent that a very simple and compact power mower has been provided. As best shown from the schematic diagram of Fig. 16 of the drawings, a very simple mowing procedure is permissible. By moving the handle from one side of the mower to the other, no so-called "cord problem" is involved. Preferably, one starts mowing at the edge of the lawn closest the power outlet and gradually moves away from the outlet, with the extension cord being kept on the cut part of the lawn, as clearly shown in Fig. 16 of the drawings. Since the mower 20 can be moved forward or backward, with either end forward, there is no need to turn the mower around at the edge of the lawn, and it is merely necessary to swing the handle over to the other side and move back across the lawn in the opposite direction. Thus, the cord is always kept on the same side of the handle and out of the way of the mower. In view of the fact, as best shown in Fig. 2 of the drawings, that the cutting members 52 and 53 extend beyond the outside edges of the wheels 23, one can cut very close to the edge of any obstruction, limited substantially only by the thickness of the wall of the peripheral flanges 22a and 22b.

In order that any damaged insulation to the power cord which might cause the line voltage to be applied to the mower 20 will not result in an electrical shock to the operator, means are provided to insure that the lawn mower 20 is grounded at all times. To this end a grounding wire is provided for two of the wheels 23, preferably diagonally positioned wheels. Thus, as is clearly shown in Figs. 1, 2, 3, 7 and 8 of the drawings, a grounding wire 150 is disposed in a groove in the associated tire 41 so as to project beyond the periphery of the tire and always be in engagement with the ground. Preferably, the grounding wire 150 has the ends thereof projecting laterally through an opening in the tire and the wheel, as designated at 150a in Fig. 7 of the drawings. The ends of the lateral projections 150a extending through the wheel are further deformed laterally as indicated at 150b so as to make electrical contact with the wheel 23, which, of course, is electrically connected through the metal connections with the lawn mower proper. Thus, with this arrangement, even though a rubber-tired mower is employed, a satisfactory ground is always assured. By employing the grounding wire on two wheels diagonally mounted on the mower, such grounding connection is insured even though the front end or the back end of the mower is tipped up, which is sometimes necessary when going over curbs or the like. Preferably, the grounding wire 150 is formed of stainless steel. With this arrangement the operator need not worry about a short circuit and resultant shock if the mower is left out in the rain. There is no danger of even a slight shock which is common with other electric lawn mowers.

Instead of a cutting member employing hinged blade members as described above, the twin-blade lawn mower of the present invention may employ a pair of rigid blades such as the blade 155 shown in Fig. 17 of the drawings. A portion of the cutter shaft 156 is illustrated which has secured to the lower end thereof a support 157 to which the blade 155 may be attached as by fastening means 158 and 159. The support 157 is preferably brazed or otherwise secured to the cutter shaft 156. The ends of the blade 155 are provided with cutting surfaces designated as 155a and 155b, corresponding to the cutting surfaces 55a and 56a in the blade, best shown in Fig. 4 of the drawings.

The operation of the present invention will readily be understood, in view of the detailed description included above, and no further discussion is included herewith. It will be appreciated that a suitable leaf mulcher attachment may readily be employed, if desired, and the housing 22 is preferably provided with means to permit ready attachment of such a mulcher. Such means are indicated in Fig. 2 of the drawings as comprising tapped openings 160 in integral projections secured to the housing 22, and tapped openings 161 defined in the bottom of the peripheral flanges 22a and 22b, respectively.

It will be apparent that the discharge chutes 28 and 29 are directed toward the adjacent wheels 23 so that likelihood of an operator inserting a limb or other obstruction into the discharge chutes is minimized. Certainly the inadvertent insertion is substantially prevented. A very simple mechanism is provided including means for eliminating damage when foreign objects are struck by the cutting members while still insuring satisfactory operation and long years of service. With the twin-blade arrangement, a very small front-to-back arrangement is provided, eliminating the lawn "scalping" problem.

While there has been illustrated and described what is at present considered to be a preferred embodiment of the present invention and a single modification thereof, it will be appreciated that numerous changes and modifications are likely to occur to those skilled in the art, and it is intended in the appended claims to cover all those changes and modifications which fall within the true spirit and scope of the present invention.

What is claimed as new and desired to be secured by Letters Patent of the United States is:

1. In a lawn mower, the combination of a support having a platform portion with a downwardly directed peripheral flange to define a housing open at the bottom, said housing having a front to back dimension approximately one half the side to side dimension thereof, ground wheels supporting said housing, a first rotary cutter for cutting a swath approximately as wide as the front to back dimension of said housing operatively associated with and rotatable in said housing about a first vertical axis, and a second rotary cutter substantially identical with said first cutter operatively associated with and rotatable in said housing about a second vertical axis, said first and second vertical axes being spaced apart laterally a distance slightly less than said front to back dimension of said housing so as to provide a slight overlapping of adjacent cutter ends and insure a cut area upon operation of said mower having a width substantially twice the width of said front to back dimension.

2. A lawn mower comprising a support having a platform portion with a downwardly directed peripheral flange to define a housing open at the bottom, ground wheels supporting said housing, a first rotary cutter of predetermined length operatively associated with and rotatable in said housing about a first vertical axis, and a second rotary cutter of substantially the same predetermined length as said first cutter operatively associated with and rotatable in said housing about a second vertical axis, said first and second vertical axes being spaced apart laterally a distance slightly less than said predetermined length so as to provide a slight overlapping of adjacent cutter ends and insure a cut area upon operation of said mower having a width substantially twice the width of said predetermined length, the front to back dimension of said housing measured along the path of movement of said housing when supported on said ground wheels being slightly greater than said predetermined length to provide a minimum front to back dimension and eliminate scalping of the lawn when said mower is used on uneven ground.

3. A lawn mower comprising a support having a platform portion with a downwardly directed peripheral flange to define a housing open at the bottom, ground wheels supporting said housing, a first rotary cutter of predetermined length operatively associated with and rotatable in said housing about a first vertical axis, a second rotary cutter of substantially the same predetermined length as said first cutter operatively associated with and rotatable in said housing about a second vertical axis, said first and second vertical axes being spaced apart laterally a distance slightly less than said predetermined length so as to provide a slight overlapping of adjacent cutter ends and to insure a cut area upon operation of said mower having a width substantially twice the width of said predetermined length, the front to back dimension of said housing measured along the path of movement of said housing when supported on said ground wheels being slightly greater than said predetermined length to provide a minimum front to back dimension and eliminate scalping of the lawn when said mower is used on uneven ground, and a pair of grass exhaust chutes defined at diametrically opposed sides of said housing.

4. In a lawn mower, the combination of a support having a platform portion with a downwardly directed peripheral flange to define a housing open at the bottom, ground wheels supporting said housing, a first rotary cutter of predetermined length operatively associated with and rotatable in said housing about a first vertical axis, a second rotary cutter of substantially the same predetermined length as said first cutter operatively associated with and rotatable in said housing about a second vertical axis, said first and second vertical axes being spaced apart laterally a distance slightly less than said predeterminde length so as to provide a slight overlapping of adjacent cutter ends and insure a cut area upon operation of said mower having a width substantially twice the width of said predetermined length, and a prime mover supported on said platform and drivingly connected to each of said cutters, the front to back dimension of said housing measured along the path of movement of said housing when supported on said ground wheels being substantially equal to said predetermined length to provide a minimum front to back dimension and eliminate scalping of the lawn when said mower is used on uneven ground.

5. A lawn mower comprising a support having a platform portion with a downwardly directed peripheral flange to define a housing open at the bottom, said housing having a front to back dimension approximately one half the side to side dimension thereof, ground wheels supporting said housing, a first rotary cutter for cutting a swath approximately as wide as the front to back dimension of said housing operatively associated with and rotatable in said housing about a first vertical axis, a second rotary cutter substantially identical with said first cutter operatively associated with and rotatable in said housing about a second vertical axis, said first and second vertical axes being spaced apart laterally a distance slightly less than said front to back dimension of said housing so as to provide a slight overlapping of adjacent cutter ends and insure a cut area upon operation of said mower having a width substantially twice the width of said front to back dimension, a pair of exhaust chutes connected to the housing one at the front and one at the back of said housing, each of said exhaust chutes having its opening directed toward a different one of said ground wheels.

6. The lawn mower of claim 1 wherein each of said rotary cutters comprises a central element having secured thereto at diametrically opposed points a pair of cutting blades moved to cutting position by the centrifugal force created upon rotation of said central element.

7. In a lawn mower, the combination of a support having a platform portion with a downwardly directed peripheral flange to define a housing open at the bottom, said housing having a front to back dimension approximately one half the side to side dimensions thereof, ground wheels supporting said housing, a first rotary cutter for cutting a swath approximately as wide as the front to back dimension of said housing operatively associated with said housing and rotatable about a first vertical axis, a second rotary cutter substantially identical with said first cutter operatively associated with said housing and rotatable about a second vertical axis, said first and second vertical axes being spaced apart laterally a distance slightly less than said front to back dimension of said housing so as to provide a slight overlapping of adjacent cutter ends and insure a cut area upon operation of said mower having a width substantially twice the width of said front to back dimension, an electric motor mounted on said platform, a first means drivingly connecting said motor to said first rotary cutter, and a second means drivingly connecting said motor to said second rotary cutter, said first and second means maintaining said cutters in predetermined phase relationship displaced approximately by ninety degrees.

8. A lawn mower comprising a light weight casting having a platform portion with a downwardly directed peripheral flange to define a housing open at the bottom, said housing having a front to back dimension approximately one half the side to side dimension thereof, ground wheels supporting said housing, a first rotary cutter for cutting a swath approximately as wide as the front to back dimension of said housing operatively associated with and rotatable in said housing about a first vertical axis, a second rotary cutter substantially identical with said first cutter operatively associated with and rotatable in said housing about a second vertical axis, said first and second vertical axes being spaced apart laterally a distance slightly less than said front to back dimension of said housing so as to provide a slight overlapping of adjacent cutter ends and insure a cut area upon operation of said mower having a width substantially twice the width of said front to back dimension, and a handle connected to said housing and pivoted about an axis extending from side to side of said housing and symmetrical therewith, whereby said handle may be moved toward either the front or back of said housing when using said mower depending upon the direction of movement of said housing.

9. In a lawn mower, the combination of a support having a platform portion with a downwardly directed peripheral flange to define a housing open at the bottom, a prime mover mounted on said platform, said housing having a front to back dimension approximately one half the side to side dimension thereof, ground wheels supporting said housing, a first rotary cutter for cutting a swath approximately as wide as the front to back dimension of said housing operatively associated with and rotatable in said housing about a first vertical axis, a second rotary cutter substantially identical with said first cutter operatively associated with and rotatable in said housing about a second vertical axis, means drivingly interconnecting said prime mover and said cutters, said first and second vertical axes being spaced apart laterally a distance slightly less than said front to back dimension of said housing so as to provide a slight overlapping of adjacent cutter ends and insure a cut area upon operation of said mower having a width substantially twice the width of said front to back dimension, and a slip clutch interposed between said cutters and said prime mover for preventing damage to said mower should one or both of said cutters strike some foreign object.

10. A power lawn mower comprising a support including a casting having an upwardly directed integral flange defining a mechanism chamber within the area defined by said flange, said casting including an integral downwardly directed flange defining a cutting chamber within the area defined by said downwardly directed flange, said casting further including an integral wall portion separating said chambers, a prime mover supported on the top of said upwardly directed flange including a rotatable shaft extending into said mechanism chamber, a pair of spaced vertically disposed cutter shafts journalled in said wall with the upper ends of said cutter shafts disposed in said mechanism chamber and the lower ends thereof disposed in said cutter chamber, a first cutter in said cutter chamber secured to one of said cutter shafts, a second cutter in said cutter chamber secured to the other of said cutter shafts, and means drivingly interconnecting said prime mover and said cutter shafts, said last mentioned means including means for maintaining said first and second cutters in a predetermined phase relationship whereby the longitudinal axes of said cutters are never coincident.

11. The lawn mower of claim 10 wherein said cutters each comprise a central element having secured thereto at diametrically opposed points a pair of cutting blades moved to cutting position by the centrifugal force created upon rotation of said central element.

12. A lawn mower comprising a carriage, two pairs of equal-sized wheels supporting said carriage, one pair of said wheels being secured to said carriage at the front end thereof on a common transverse axis, the second pair being secured to said carriage at the rear end thereof on a common transverse axis, a pair of cutter shafts each mounted upon said carriage for rotation about a different vertical axis, said cutter shaft axes being spaced apart laterally along a line midway between said wheel axes, said cutter shafts each extending below said carriage, a pair of cutters each secured to the lower end of a different one of said shafts for rotation therewith and each including a plurality of cutting blades sweeping through a circular path, a handle having a forked end pivotally connected to said carriage and being swingable to the front and rear of said carriage whereby said carriage may be pushed in either direction without turning the carriage around, stop means on said carriage and positioned to engage the forked end of said handle and to support said handle in two oppositely inclined pushing positions at the two ends of said carriage, whereby in either pushing position of said handle the forward set of wheels may be raised off the ground by pressing the handle below the operating position determined by said stops, said cutter blades having a sweep radius extending laterally to the extremities of said supporting wheels whereby said mower cuts a swath equal in width to the distance between the remote sides of each pair of wheels.

13. The lawn mower of claim 12 wherein an electric motor is supported on said carriage and said cutter shafts are of different lengths and are drivingly connected to said electric motor.

14. The lawn mower of claim 7 wherein said first and second means comprise toothed belts.

15. In a power operated lawn mower comprising a housing defining a cutter chamber, a plurality of wheels, supporting said housing, a pair of discharge chutes one at the rear and one at the front of said housing, said discharge chutes being tangentially disposed relative to said housing and each directed toward a different one of said wheels whereby the possibility of inadvertently inserting an object into said discharge chutes is greatly reduced, a motor mounted on said housing, a rotary cutter mounted for rotation in said housing and drivingly connected to said motor, said cutter causing grass clippings to be discharged through both of said discharge chutes, and a handle having a forked end pivotally connected to said housing and being swingable to the front and rear of said housing whereby said housing may be pushed in either direction without turning said housing around.

16. A power lawn mower comprising a support including means defining a mechanism chamber and means defining a cutting chamber, said support including a wall portion separating said chambers, a prime mover mounted on said support and having a rotatable shaft extending into said mechanism chamber, a pair of spaced vertically disposed cutter shafts journalled in said wall with the upper ends of said cutter shafts disposed in said mechanism chamber and the lower ends thereof disposed in said cutter chamber, a first cutter in said cutter chamber secured to one of said cutter shafts, a second cutter in said cutter chamber secured to the other of said cutter shafts, a pair of pulleys on said motor shaft in said mechanism chamber disposed one above the other, a first pulley on said first cutter shaft on the level of one of said pair of pulleys, a second pulley on said second cutter shaft on the level of the other of said pair of pulleys, a first belt drivingly connecting said one of said pair of pulleys and said first pulley, a second belt drivingly connecting the other of said pair of pulleys and said second pulley, and means maintaining said pulleys and consequently said cutters in a predetermined out of phase relationship.

17. The lawn mower of claim 16 wherein said pair of pulleys are frictionally clamped to said motor shaft to provide a slip clutch permitting relative rotation between said pair of pulleys and said motor shaft and wherein means are provided to prevent relative rotation between the pulleys of said pair of pulleys.

References Cited in the file of this patent
UNITED STATES PATENTS

| | | |
|---|---|---|
| 913,943 | Brown | Mar. 2, 1909 |
| 2,276,818 | Bellows | Mar. 17, 1942 |
| 2,535,457 | Roberts | Dec. 26, 1950 |
| 2,573,600 | Pruehs | Oct. 30, 1951 |
| 2,654,986 | Gold | Oct. 13, 1953 |
| 2,716,323 | Ford | Aug. 30, 1955 |
| 2,716,559 | Boyce | Aug. 30, 1955 |
| 2,719,396 | Morris et al. | Oct. 4, 1955 |
| 2,724,598 | Knarzer | Nov. 22, 1955 |
| 2,734,325 | La Bonte | Feb. 14, 1956 |
| 2,740,249 | Stearns | Apr. 3, 1956 |
| 2,748,553 | Funk | June 5, 1956 |
| 2,760,327 | Bovee | Aug. 28, 1956 |
| 2,763,116 | Flinchbaugh et al. | Sept. 18, 1956 |
| 2,770,085 | Laughlin | Nov. 13, 1956 |
| 2,786,694 | Gray | Mar. 26, 1957 |
| 2,791,437 | Knarzer | May 7, 1957 |
| 2,815,634 | Bush | Dec. 10, 1957 |